United States Patent [19]

Kraft

[11] Patent Number: 5,019,761
[45] Date of Patent: May 28, 1991

[54] FORCE FEEDBACK CONTROL FOR BACKHOE

[76] Inventor: Brett W. Kraft, 11667 W. 90th St., Overland Park, Kans. 66214

[21] Appl. No.: 313,958

[22] Filed: Feb. 21, 1989

[51] Int. Cl.$^5$ .......................... G06F 15/46; B25J 9/00
[52] U.S. Cl. ........................ 318/568.11; 318/568.16; 318/568.21; 318/568.1; 364/513; 364/424.01; 414/730; 414/699; 901/2; 901/4
[58] Field of Search ................. 318/560–646; 414/695–699, 700, 705, 715, 718, 719, 720, 721, 722, 723, 724, 725, 729, 730, 731, 732, 733, 734, 735, 728; 364/424.07, 513, 174, 167.01; 901/2, 3, 9, 21, 22, 25, 29, 32, 28, 38, 46, 48; 172/4.5, 430, 431, DIG. 3, 1

[56] References Cited

U.S. PATENT DOCUMENTS

| | | | |
|---|---|---|---|
| 3,934,186 | 1/1976 | Hayakawa et al. | 318/568.11 X |
| 4,134,505 | 1/1979 | Watanabe | 414/715 |
| 4,156,835 | 5/1979 | Whitney et al. | 318/648 X |
| 4,278,920 | 7/1981 | Ruoff, Jr. | 318/568.1 X |
| 4,332,517 | 6/1982 | Igarashi et al. | 364/424.07 |
| 4,377,043 | 3/1983 | Inui et al. | 414/699 X |
| 4,432,063 | 2/1984 | Resnick | 318/568.25 X |
| 4,510,574 | 4/1985 | Guittet et al. | 318/628 X |
| 4,611,296 | 9/1986 | Niedermayr | 364/513 |
| 4,621,332 | 11/1986 | Sugimoto et al. | 364/174 X |
| 4,640,663 | 2/1987 | Ninomi et al. | 414/730 |
| 4,661,032 | 4/1987 | Arai | 901/8 X |
| 4,742,468 | 5/1988 | Ohashi et al. | 364/424.07 |
| 4,744,218 | 5/1988 | Edwards et al. | 414/699 X |
| 4,745,744 | 5/1988 | Cherry et al. | 364/513 X |
| 4,748,782 | 3/1987 | Kraft | 417/735 |
| 4,766,775 | 8/1988 | Hodge | 901/23 X |
| 4,773,302 | 9/1988 | Mizota et al. | 414/700 X |
| 4,829,418 | 5/1989 | Nielsen et al. | 364/167.01 |
| 4,831,531 | 5/1989 | Adams et al. | 318/628 X |
| 4,837,734 | 6/1989 | Ichikawa et al. | 364/513 |
| 4,844,685 | 7/1989 | Sagaser | 414/701 X |
| 4,853,874 | 8/1989 | Iwamoto et al. | 901/8 X |
| 4,863,337 | 9/1989 | Ishiguro et al. | 414/699 |
| 4,866,641 | 9/1989 | Nielsen et al. | 414/699 X |
| 4,893,981 | 1/1990 | Yoshinada et al. | 318/628 X |
| 4,942,538 | 7/1990 | Yuan et al. | 364/513 |
| 4,950,116 | 8/1990 | Nisida | 901/8 X |

OTHER PUBLICATIONS

Material Handling, John Deere, 1975.
Grips Kraft prior to May, 1980.
Scorpio, Ametek, prior to May, 1988.

Primary Examiner—Paul Ip
Attorney, Agent, or Firm—Litman, McMahon & Brown

[57] ABSTRACT

A force feedback control system for a backhoe includes a single grip articulated control arm having members and joints therebetween analogous to the members and joints of an articulated backhoe arm connecting an excavation bucket to a backhoe frame. A bilateral closed loop control circuit compares slave position signals from output joint position sensors associated with the backhoe arm joints with corresponding master position signals from input joint sensors associated with the control arm joints and provides command signals to actuators associated with the backhoe joints to move them so that differences in corresponding master and slave position signals are minimized. Backhoe joint load sensors provide load signals indicating resistance to movement of the associated backhoe joints, and the control circuit generates force feedback signals to drive feedback motors associated with the control arm joints to apply toruqes thereto to reflect the resistance to movement of the associated backhoe joints.

15 Claims, 5 Drawing Sheets

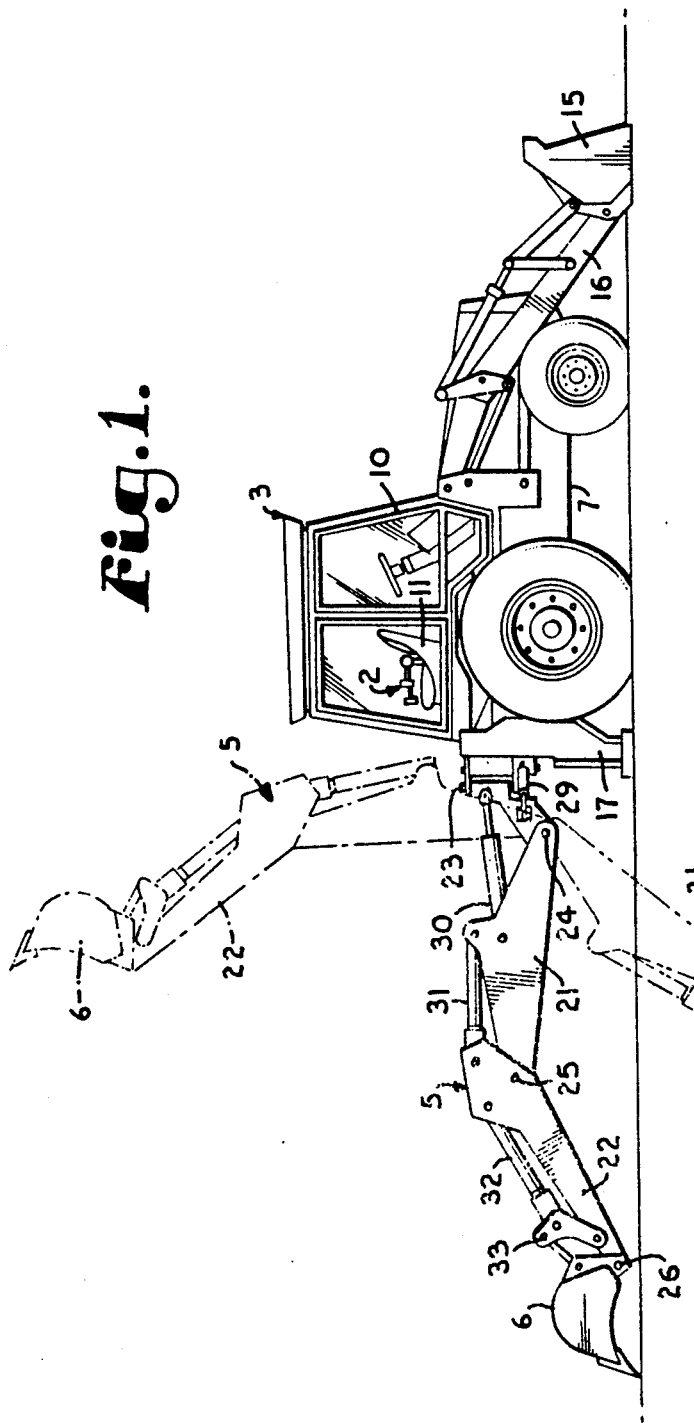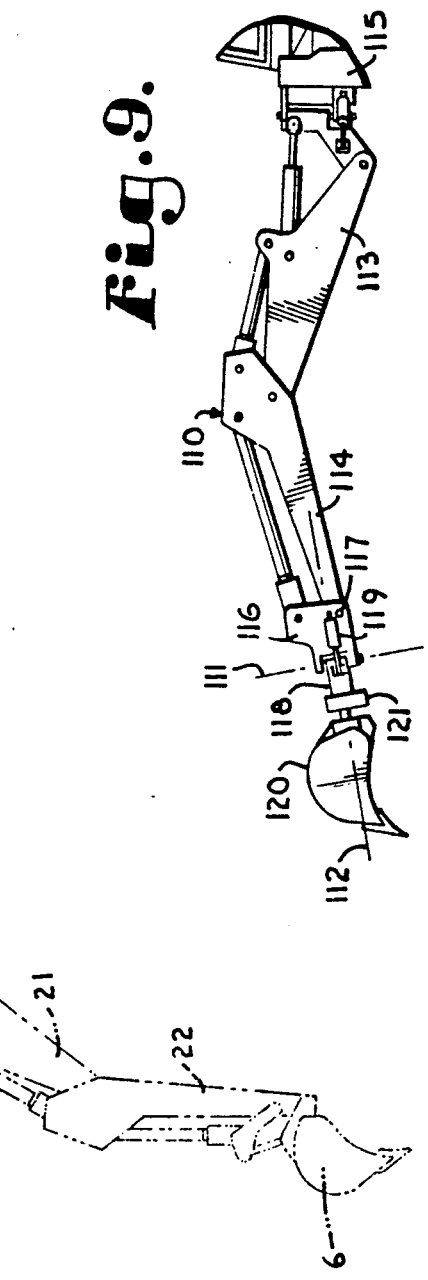

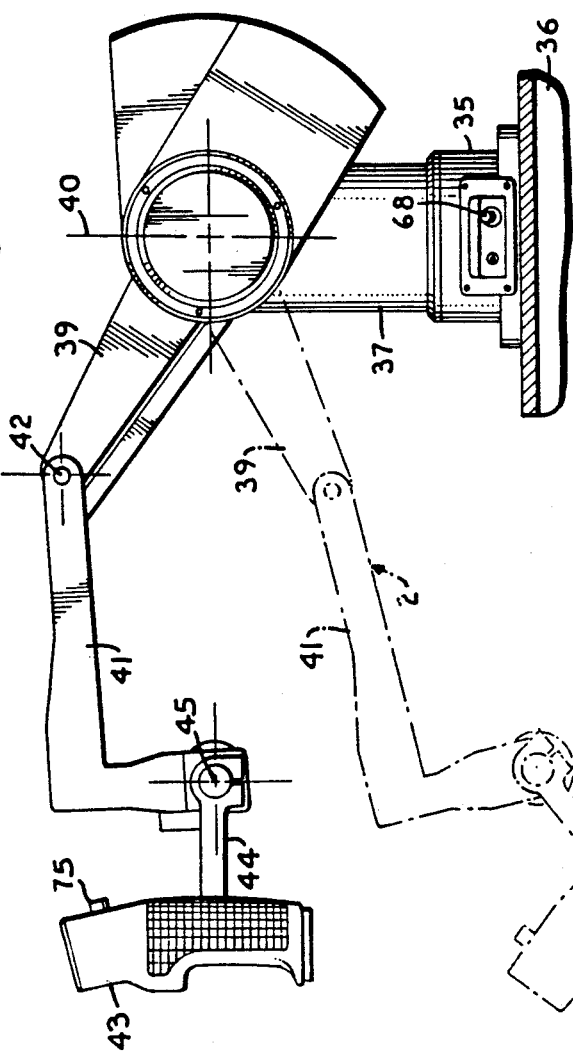
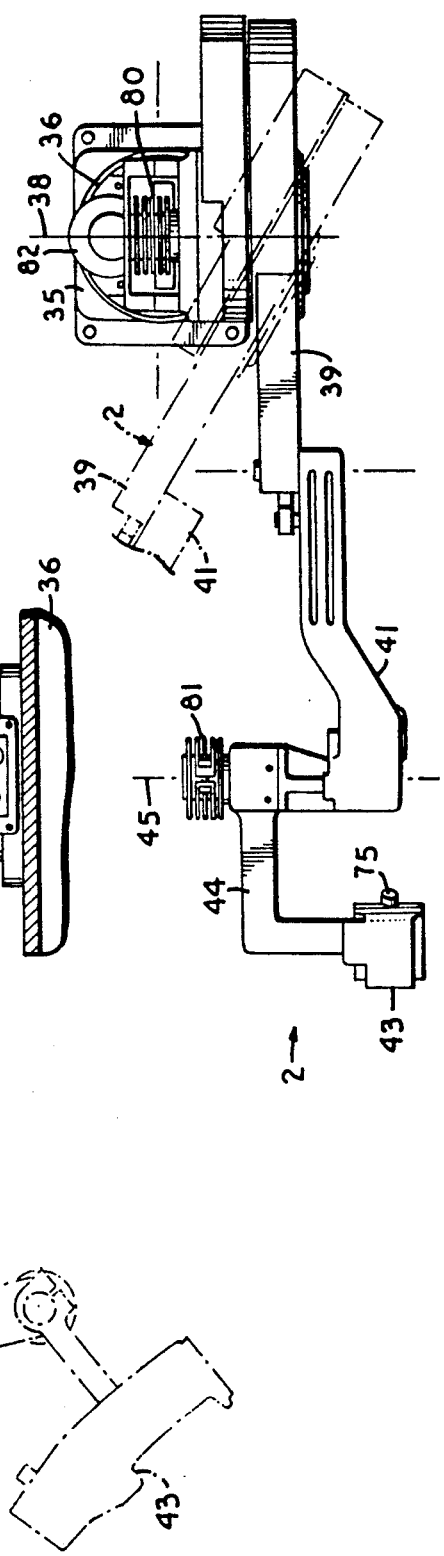
Fig. 2.
Fig. 3.

FORCE FEEDBACK CONTROL FOR BACKHOE

FIELD OF THE INVENTION

The present invention relates to earthworking implements and, more particularly, to a force feedback control system for a backhoe.

BACKGROUND OF THE INVENTION

In conventional earthworking implements, such as backhoes, excavators, loaders, and the like, an earthworking tool is mounted on one or more arms connected to a vehicle, and the tool and arm are moved by the extension and retraction of hydraulic cylinders. An operator controls the functions of the tool by the operation of levers associated with hydraulic valves. High pressure hydraulic systems are employed, in which pressures may range to 2000 pounds per square inch and more. Thus, depending on the diameter of the hydraulic cylinders employed and the leverage involved, great amounts of force can be brought to bear by the implement tool.

Hydraulic valves for such equipment are generally of the reversible on/off type wherein, for example, pressing a control lever in one direction opens a valve to cause a cylinder to extend; releasing the lever allows it to center thereby closing the valve; and pressing the lever in the opposite direction reverses the valve to cause retraction of the cylinder. The only input force required of the operator is that which is required to overcome a lever centering spring. Because the input force of the system is very low and the output force resulting therefrom is relatively high, the force or power gain of the system is very high.

The type of control systems used on conventional earthworking implements, absent the operator, is of the open loop type. That is, the output parameter of the system, displacement of the tool or arm, is not fed back to the system for comparison with the input parameter to derive an error signal, which then causes correction of the displacement until the error signal is zeroed. The only feedback available is visual feedback to the operator who makes a judgement about the displacement 'error' and manually controls a corrective displacement. The lack of displacement or force feedback in conventional implement control systems results in a lack of 'feel' in the control levers.

In general, each available function of the tool is controlled by a corresponding single axis control lever, although the combination of two functions on a dual axis lever, or joystick, is sometimes provided. In a conventional backhoe, four tool functions are controlled including boom swing, boom elevation, crowd or elbow angle, and bucket curl or pitch. Thus, a minimum of two dual axis levers or, more conventionally, four single axis levers are required to control the bucket of a backhoe. The two or four control levers do not resemble the configuration of the bucket arm such that learning to control a given backhoe by its levers is not intuitive. An operator must associate the labeled name of a lever or its position in relation to the other levers with the backhoe function it controls. An additional problem, particularly with four levers, is that efficiency of operation of the backhoe suffers form the need for the operator to switch hands from lever to lever to coordinate the movements of the bucket. As a result of these and other factors, considerable expense and practice time is often required to train a profficient and safe backhoe operator.

Because of the lack of feel in the hydraulic control levers, problems can arise even for an experienced operator. For example, if it is necessary to excavate near a pipeline or other existing structure using a backhoe, great car must be exercised to avoid damage to the existing structure, since resistance to movement of the bucket caused by contact of the bucket with the structure is not fed back to the control levers. In order to avoid such damage when working at close quarters, it is sometimes necessary to station an additional worker to observe the operation and signal movements to the backhoe operator.

It is foreseen that the use of a unilateral closed loop control system to control a backhoe might result in the creation of problems and hazards not present in conventional backhoe control systems. In a unilateral master-slave position control system, a position input at a control lever is compared with a sensed position of the corresponding function, and the function actuator, such as a hydraulic cylinder, is activated to reduce the position error sensed. Because it takes a finite amount of time to fill a hydraulic cylinder, it would be possible for the master lever to get considerably ahead of the cylinder controlled resulting in a desynchronization of the master and slave. The same result could occur, for example, if the bucket encounters an obstacle. The situation is further complicated by multiple control axes such that an operator can become, in effect, 'disoriented' with respect to the positions of the control levers relative to the position of the bucket. Attempts by the operator and the control system to recover from such a situation could result in unpredictable movements of the backhoe arm. With a large heavy implement capable of applying tens of thousands of pounds of force in the vicinity of other workers, equipment, and structures, such a situation is of necessity to be avoided.

In conventional backhoes the bucket is movable through four degrees of freedom: extension and retraction, raising and lowering, swinging from side to side, and curl of the bucket about a horizontal axis. To some extent, this limits the utility of such a backhoe. In some situations, it would be desirable for the bucket to be able to yaw with respect to the dipper arm to which it is connected and to rotate about a wrist type of axis. This would provide the bucket with six degrees of freedom and would facilitate the use of a backhoe in trenching types of excavation in planes other than vertical. Such a capability might be desirable in excavating beneath an elongated horizontal structure, such as an existing pipe. One obstacle to developing such a six degree backhoe is that two additional single axis control levers or an additional dual axis control lever would be required which would exacerbate the problem of coordinating the control levers.

SUMMARY OF THE INVENTION

The present invention provides a bilateral closed loop force feedback backhoe control system in which command inputs are made through a single grip control arm which is mechanically analogous to a backhoe bucket manipulator arm. In essence, a forward control loop of the bilateral control system causes the backhoe arm to mimic or articulate in correspondence to articulation of the operator control arm. A reflected or reverse control loop causes feedback forces to be applied to the control arm in correspondence to resistances to articulation of the backhoe arm.

A desired articulation of the backhoe arm or bucket is effected by inputting a geometrically or mechanically analogous articulation through the control arm. The force feedback feature provides a tactile sense through the control arm when the backhoe arm or bucket has encountered an obstacle. Control of all the backhoe functions by one hand or arm using a single grip control arm greatly improves the coordination of control functions as compared to multiple lever controls. The combination of these features greatly accelerates training an operator for a backhoe so equipped and improves the efficiency and safety of operation thereof by an experienced operator.

A preferred embodiment of the control system is adapted for controlling the operation of a four axis backhoe having a boom connected by a swing joint and a boom elevation joint to a backhoe frame, a dipper arm connected by a crowd joint to the boom, and a bucket connected by a bucket rotation joint to the dipper arm. Each backhoe arm joint has a hydraulic actuator, a backhoe arm joint position sensor, and a backhoe joint load sensor associated with it. All of the backhoe joints allow pivoting about horizontal axes except the swing joint which is about a vertical axis.

The control arm is a four axis control arm adapted for operation by one hand and includes an upper arm connected by a shoulder swing joint and a shoulder elevation joint to a control arm base, a forearm connected by an elbow joint to the upper arm, and a handle connected by a handle rotation joint to the forearm. A control arm joint position sensor and feedback motor is associated with each of the control arm joints. The master joints including shoulder swing and elevation joints, elbow joint, and handle joint of the control arm correspond respectively to the slave joints including the swing joint, boom elevation joint, crowd joint, and bucket curl or pitch joint of the backhoe arm.

The bilateral closed loop control circuit compares a slave joint position signal caused by an articulation of a master joint with a corresponding master joint position signal and activates the associated hydraulic actuator to articulate the slave joint to zero a difference between the slave and master joint position signal. The backhoe joint load sensors generate slave joint load signals indicating resistance to articulation of the associated slave joints which causes the control circuit to activate the corresponding feedback motors to apply torques or counter articulation forces to the corresponding master joints.

The control circuit may be separated into a master controller associated with the control arm and a slave controller associated with the backhoe, with the master and slave controllers communicating over a wired or wireless data communication link. Such an arrangement allows remote control of the backhoe functions by the control arm, as for use in hazardous environments or to handle hazardous materials.

A modified embodiment of the control system includes a control arm having six degrees of freedom for controlling the functions of a backhoe arm having six degrees of freedom. The six axis control arm adds a handle yaw joint and a wrist rotation joint to the four axis control arm described above. The six axis backhoe adds a bucket yaw joint and a bucket wrist rotation joint to the four axis backhoe arm. A control circuit for a six axis arrangement is substantially similar to the four axis control circuit except that two control channels are added.

OBJECTS OF THE INVENTION

The principal objects of the present invention are: to provide an improved system for controlling earthworking implements, particularly implements with implement tools movable through multiple degrees of freedom; to provide such a control system which greatly facilitates the manipulation of such an implement tool; to provide such a system which is a closed loop control system, particularly a bilateral closed loop control system; to provide such a system which feeds back to a control input device forces proportional to those acting on the implement tool and means articulating it to the implement; to provide such a system particularly for controlling a backhoe; to provide such a system including a control input arm having members and joints which correspond to members and joints of a backhoe bucket articulation arm; to provide such a system in which all the functions of a backhoe arm can be controlled by one handed manipulation of the control input arm; to provide such a system for controlling a conventionally configured backhoe including a swing joint, a boom elevation joint, a crowd joint, and a bucket curl or pitch joint along with corresponding hydraulic actuators for movement of the bucket via such joints; to provide such a system in combination with a backhoe which additionally incorporates a bucket yaw joint and a bucket curl or pitch joint; to provide such a system including a backhoe joint position sensor for each backhoe joint and a control arm joint position sensor for each control arm joint, the position sensors being connected to a controller whereby upon movement of a control arm joint the controller compares a control joint position signal with a corresponding backhoe joint position signal and activates the associated actuator to move the backhoe joint to zero differences between the respective position signals; to provide such a system including a backhoe joint load sensor for each backhoe joint and a feedback motor for each control arm joint whereby the controller activates a feedback motor to reflect a resistance to movement of a backhoe joint back to the corresponding control arm joint; to provide such a system wherein the controller is capable of selectively scaling the ratio of motion of the control arm to the that of the backhoe arm; to provide such a system wherein the controller is capable of selectively offsetting the position of the control arm to that of the backhoe arm, as for operator comfort; to provide such a system wherein the controller is capable of establishing boundaries to motion of the backhoe arm in selected axes or the lockout of any motion in selected axes particularly for working in close quarters; to provide such a system wherein the controller is capable of recording a sequence of motions of the backhoe arm for subsequent recall and execution; to provide such a system in which the operator may freeze the backhoe arm in any position; to provide such a system including a communication or telemetry link between a master controller connected to the control arm and a slave controller connected to the actuators, position sensors, and load sensors of the backhoe for use of the backhoe in hazardous environments or to handle hazardous materials; to provide such a system which provides intuitive control of a backhoe thereby facilitating training of a backhoe operator; to provide such a system which increases the utility and safety of a backhoe; to provide such a system which is applicable to a wide variety of earthworking implements other than backhoes such as excavators, loaders, and the like; to provide such a system retrofittable to a variety of existing backhoes; and to provide such a force feedback control system for a backhoe which is economical to manufacture, positive and precise in operation, and which is particularly well adapted for its intended purpose.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 1 is a side elevational view of a backhoe in which a force feedback control system embodying the present invention is installed, with alternate positions of a bucket articulating arm shown in phantom lines.

FIG. 2 is an enlarged side elevational view of a four axis backhoe control arm for use with the force feedback control system with an alternate position of the control arm shown in phantom lines.

FIG. 3 is an enlarged top plan view of the four axis backhoe control arm with an alternate position of the control arm shown in phantom lines.

FIG. 9 is a fragmentary side elevational view of a bucket articulation arm having six degrees of freedom and controlled by the force feedback control system of the present invention using a six axis control arm.

DETAILED DESCRIPTION OF THE INVENTION

Figure 4:
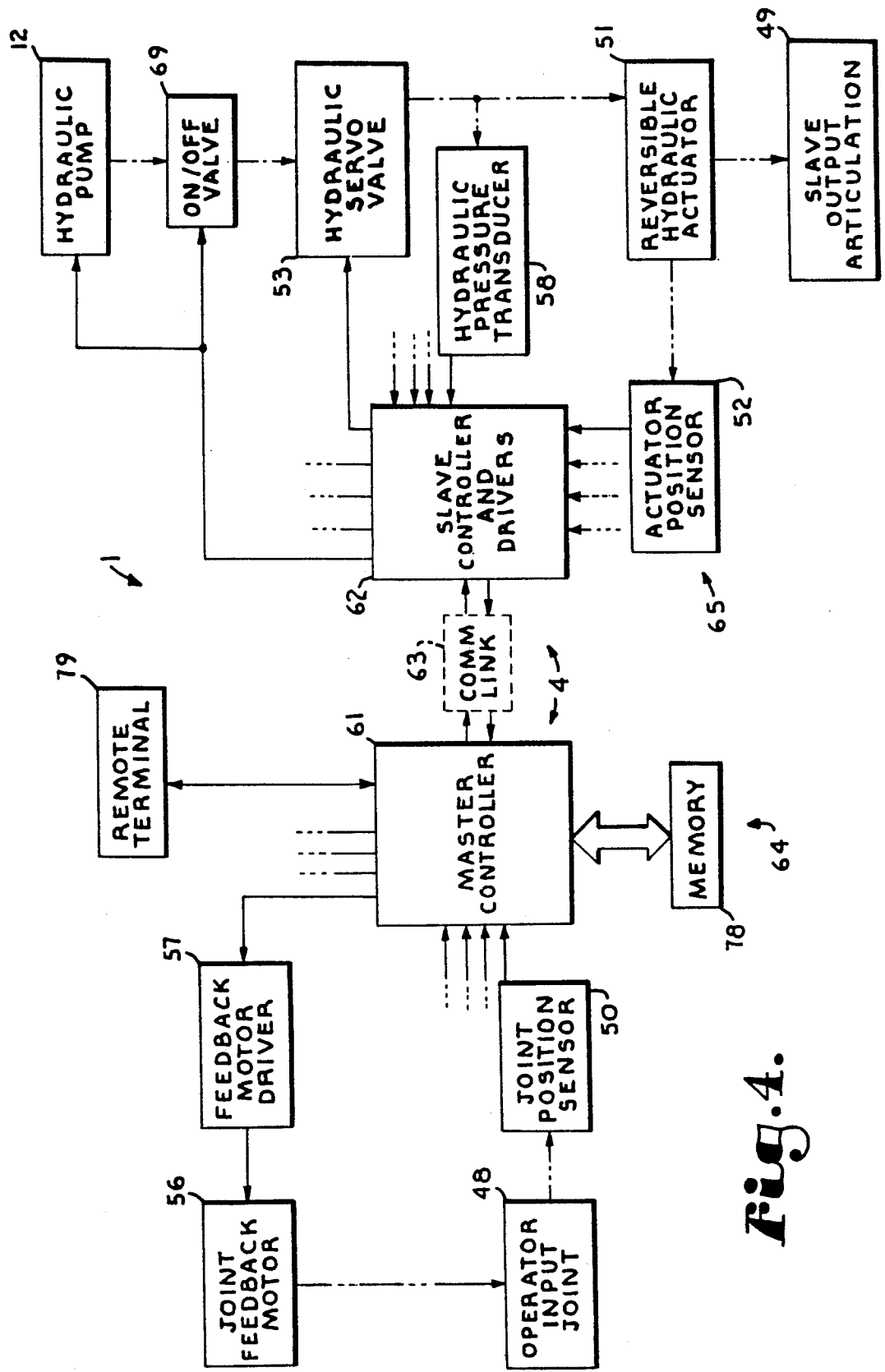
FIG. 4 is a fragmentary block diagram of the force feedback control system of the present invention and illustrates a single control channel thereof.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring to the drawings in more detail:

The reference numeral 1 (FIG. 3) generally designates a bilateral force feedback control system for a backhoe embodying the present invention. The system 1 generally includes an operator input device or control arm 2 (FIG. 1) positioned in the cab of an earthworking implement or backhoe 3 and coupled through controller circuitry 4 (FIG. 4) to an implement or backhoe arm 5 connecting an implement tool or backhoe bucket 6 to a backhoe frame 7. As will be detailed below, the control arm 2 is mechanically analogous to the backhoe arm 5, and the controller circuitry 4 causes movements of the backhoe arm 5 which correspond to similar movements of the control arm 2 by an operator of the backhoe 3. Additionally, the controller circuitry 4 causes resistance to movement of the backhoe arm 5 to be reflected proportionately to the control arm 2 as resistance to motion of the control arm 2.

As used herein, the term 'articulate' and derivations thereof such as 'articulation' and the like are intended to indicate joints or connections between members and, additionally, relative movement of such members through such joints. The term 'articulation' is broadly intended to encompass pivotal and rotary joints as well as other types of connections of members, such as sliding or telescoping joints.

The backhoe 3 illustrated in FIG. 1 is substantially conventional in most respects and includes the backhoe vehicle frame 7. An operator cab 10 has an operator seat 11 therein which may be rotated to a rearward facing position, as shown, to facilitate operation of the backhoe arm 5. The control arm 2 is mounted within the cab 10 in proximity to the seat 11 for convenient reach by an operator. The backhoe 3 includes a backhoe motor (not shown) which drives a hydraulic pump 12 (FIG. 4) for powering the backhoe arm 5 and a hydraulic reservoir 14 (FIG. 5) which supplies hydraulic fluid therefor. Additional earthworking implement tools may be provided on the backhoe 3, such as a front end loader bucket 15 which is articulated to the backhoe frame 7 by a front end loader arm assembly 16. In order to provide stability to the backhoe 3 during manipulation of the backhoe bucket 6, a pair of laterally extending outrigger feet 17 are provided.

The backhoe bucket 6 is articulated to the backhoe frame 7 by the backhoe arm 5. The arm 5 includes a swing frame 20, a boom 21, and a dipper stick or arm 22. The swing frame 20 is connected to the backhoe frame 7 through a swing joint 23 to allow pivoting of the arm 5 from side to side about a vertical swing axis. The boom 21 is connected to the swing frame 20 through a boom elevation joint 24 which allows pivoting of the boom 21 up and down about a horizontal boom elevation axis. The dipper arm 22 is connected to the boom 21 through a crowd joint 25 which allows pivoting the dipper arm 22 relative to the boom 21 about a horizontal crowd axis. The bucket 6 is connected to the dipper arm 22 through a bucket curl or pitch joint 26 which allows pivoting the bucket 6 relative to the dipper arm 22 about a horizontal bucket curl axis.

The swing frame 20 is pivoted relative to the backhoe frame 7 by a pair of opposed hydraulic swing cylinders 29 pivotally connected therebetween. The boom 21 is pivoted relative to the swing frame 20 by a hydraulic boom cylinder 30 pivotally connected therebetween. The dipper arm 22 is pivoted relative to the boom 21 by a hydraulic crowd cylinder 31 pivotally connected therebetween. Finally, the bucket 6 is pivoted relative to the dipper arm 22 by a hydraulic bucket curl cylinder 32 connected between the dipper arm 22 and a bucket frame assembly 33 including a bell crank which is pivotally connected to the bucket 6. Each of the hydraulic actuators or cylinders 29, 30, 31, and 32 is double acting and, thus, reversible. The swing cylinders 29 act in a complementary manner such that as one is extending, the other is retracting.

Referring to FIGS. 2 and 3, the illustrated single grip control arm 2 is mechanically analogous to the backhoe arm 5 and, to a limited degree, to the human arm. The control arm 2 includes a base 35 which is attached to a frame member 36 within the backhoe cab 10. A shoulder swing frame 37 is pivotally connected to the base 35 through a shoulder swing or azimuth joint 38, symbolized in FIG. 3 by cross hairs locating the vertical pivot axis of the swing joint 38. An upper arm assembly 39 is pivotally connected to the shoulder frame 37 through a shoulder elevation joint 40, symbolized by cross hairs locating the horizontal shoulder elevation pivot axis of the joint 40. A forearm 41 is pivotally connected to the upper arm 39 through an elbow joint 42 for articulation about a horizontal elbow axis. The illustrated forearm 41 is an L-shaped member. A handle or grip 43 is pivotally connected through an L-shaped handle bracket 44 to the forearm 41 by means of a wrist curl or pitch joint 45 for pivoting relative to the forearm 41 about a horizontal curl axis. The control arm 2 is adapted for controlling all the functions of the backhoe arm 5 with one hand. This leaves the other hand free for controlling other functions, such as mobility functions of the backhoe 3. The various pivot joints of the backhoe arm 5 and the control arm 2 are interchangeably referred to hereinbelow by either their designations as joints or as axes.

FIG. 4 is simplified block diagram of the control system 1. In FIG. 4, solid lines between blocks represent electrical signals, lines with single dots therein represent hydraulic signals, lines with double dots represent mechanical signals, and lines with triple dots are repetition lines, representing connections of components of additional control channels. FIG. 4 illustrates a single control channel related to a set of corresponding joints on the control arm 2 and the backhoe arm 5. It should be understood that the remaining sets of articulation joints of the control arm 2 and the backhoe arm 5 are related by parallel channels of the system 1 which are omitted from FIG. 4 for graphic simplification.

In FIG. 4, an operator input joint 48, representing one of the control arm joints 38, 40, 42, or 45, is illustrated along with a slave output articulation or joint 49, representing one of the backhoe arm joints 23, 24, 25, or 26. A control arm or input joint position sensor 50 is associated with each of the input joints 48. The input joint position sensor 50 may be any of several types of rotary position sensors such as a rotary potentiometer, a rotary digital position sensor, or the like. The sensor 50 is mechanically connected between the control arm members forming the input joint 48 and provides an input joint or master position signal having a parameter indicative of the relative positions of the control arm members forming the joint 48 to the controller circuitry 4.

Each slave or backhoe joint 49 has a hydraulic actuator 51 associated therewith, representing one of the cylinders 30–31 or the cylinder set 29. Each actuator 51 has an actuator position sensor 52 coupled thereto to provide an actuator or slave position signal having a parameter indicating the relative extension or retraction thereof to the controller circuitry 4. The actuator position sensor 52 may be resistive, digital, or the like. Alternatively, the actuator position sensor 52 could be coupled between the backhoe members forming the output joint 49, wherein it would be equivalently be referred to as an output joint position sensor. The flow of hydraulic fluid from the hydraulic pump 12 to each actuator 51 is controlled by a corresponding hydraulic servo valve 53, or valve set in the case of the swing cylinder set 29. The valve 53 receives operating signals from the controller circuitry 4.

The controller circuitry 4 is a closed loop control system. A displacement of the input joint 48 is sensed by the controller 4 by way of the master position signal provided by the input joint position sensor 50. The current position of the corresponding actuator 51 is indicated by the slave position signal provided by the actuator position sensor 52. The controller 4 compares the master and slave position signals and generates an error signal indicating the difference therebetween and applies it to the actuator 51 through the valve 53 to move the slave joint 49 in such a direction or sense as to diminish the error signal. The time response of the system 1 is preferably fast enough that the slave joints 49 of backhoe arm 5 appear to move in synchronism with the input joints 48 of the control arm 2.

The system 1 is a bilateral control system in that command signals are sent from the input joints 48 to the slave joints 49, and force feedback signals are sent from the slave joints 49 back to the input joints 48 to provide the operator with a tactile sense or feel of resistance to articulation of the slave joints 49. Each input joint 48 is provided with a feedback motor 56 connected between the control arm members connected by the input joint 48. Each feedback motor 56 includes feedback motor driver circuitry 57 which is connected to the controller circuitry 4. Each hydraulic actuator 51 has a differential hydraulic pressure transducer or sensor 58 connected in the hydraulic lines thereto. The pressure transducer 58 provides a slave joint load signal to the controller circuitry 4 proportional to the difference in pressure in the hydraulic fluid being pumped into the double acting actuator 51 and the fluid being forced out.

The difference in pressure is a measure of resistance to articulation of the slave joint 49 arising from inertia in the backhoe arm members connected by the slave joint 49, from contact by members of the backhoe arm 5 with the ground being excavated or structures in proximity to the backhoe 3 (including members of the backhoe 3 itself), or from the limit of extension or retraction of one of the actuators 51. The controller circuitry 4 processes the slave joint load signals and generates force feedback signals proportional to the load signals which cause the application of forces or torques proportional to the resistance forces to the corresponding input joints 48. The scaling or proportionality between the slave joint resistances and the input joint torques can be adjusted through the controller circuitry 4 according to the size and leverage of the backhoe arm members and the force capacities of the actuators 51.

The control system 1 may be a single integrated unit mounted in the cab 10 of the backhoe 3 along with the control arm 2, and this is a preferred configuration in most installations. Alternatively, the functions of the backhoe arm 5 can be controlled remotely. Such a configuration might be desirable if the backhoe 3 were to be used in a hazardous environment or to handle hazardous materials. For such a remote operation, the controller circuitry 4 is separated into a master controller 61 and a slave controller 62 coupled or interfaced by a communication link 63. The communication link 63 may be any appropriate conventional type of wired or wireless serial or parallel data communication link, such as a direct wired link, a fiber optic link, a radio link, a microwave link, or the like.

A master unit 64 including the master controller 61 and the control arm 2 with input position sensors 50 and feedback motors 56 may be stationed in a fixed installation, a mobile installation such as another vehicle, or a portable installation which is conveniently deployed and stowed. In some situations, it might even be desirable to mount the control arm 2 on the body of the operator thereof. A slave unit 65 including the slave controller 62 is mounted on the backhoe 3 along with the transducers 58 and the actuator position sensors 52 and other components connected thereto. Such an arrangement may also include a video link (not shown) to facilitate remote operation of the backhoe 3. In general, the communication link 63 communicates command signals from the master unit 64 to the slave unit 65 to cause articulation of the backhoe arm 5. Load signals from the pressure transducers 58 and actuator position signals from the actuator position sensors 52 are communicated by the link 63 from the slave unit 65 back to the master unit 64.

Figure 5:
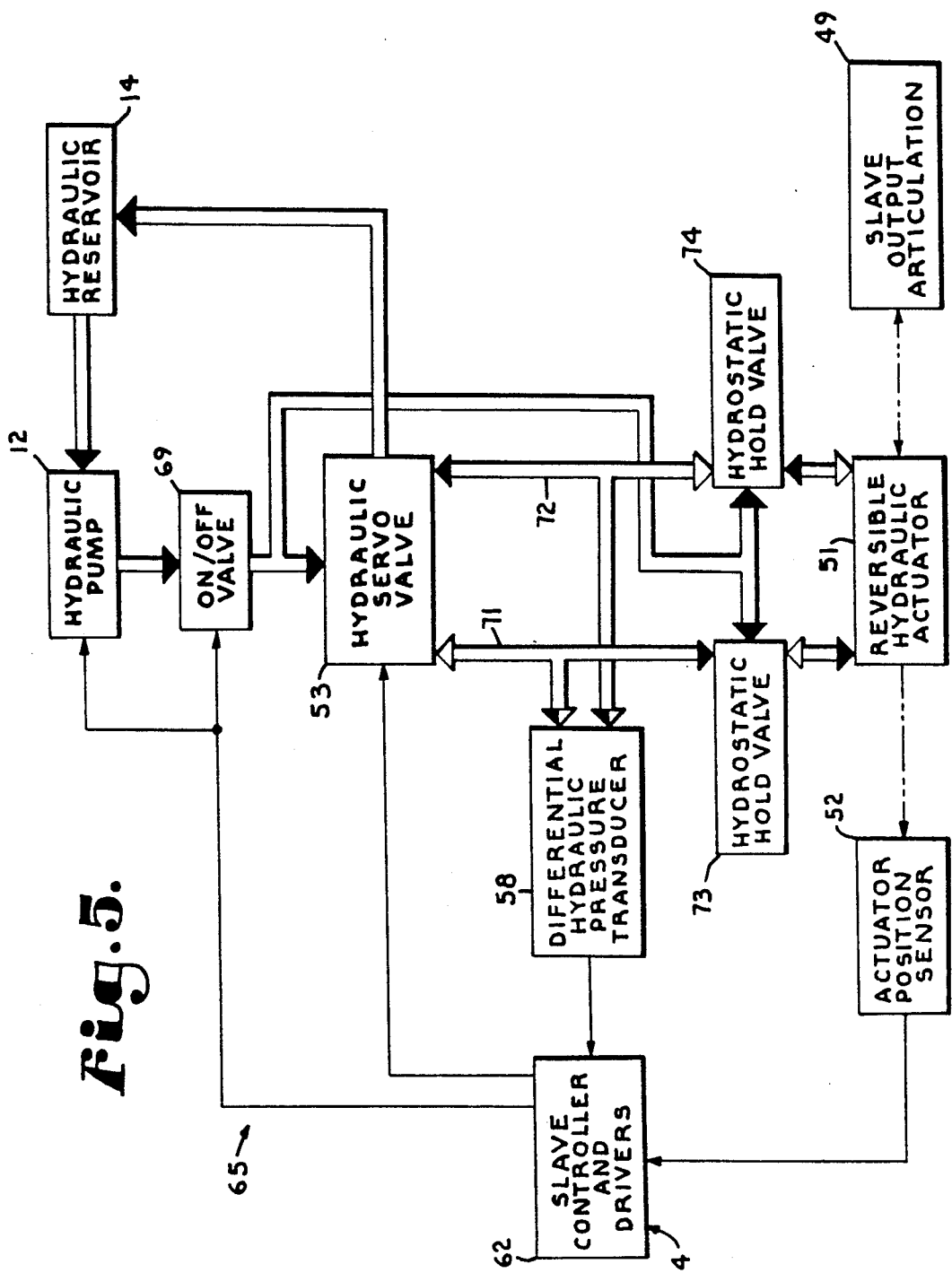
FIG. 5 is a block diagram illustrating in greater detail the components of a hydraulic portion of a control channel of the force feedback control system.

FIG. 5 illustrates further details of a typical hydraulic channel of the system 1. The hydraulic pump 12 which supplies hydraulic fluid under pressure to the actuators 51 is activated by the controller circuitry 4 in response to the operation of a hydraulic system enable switch 68 (FIG. 2) located on the base 35 of the control arm 2 and connected to the circuitry 4. The switch 68 also controls a hydraulic on/off valve 69 which enables the flow of hydraulic fluid throughout the hydraulic components of the system 1. The hydraulic servo valve 53 channels hydraulic fluid to the actuator 51 to actuate in one direction by filling one side thereof and channels fluid out of the other side and back to the reservoir 14.

In FIG. 5, between the valve 53 and actuator 51, hydraulic flow to cause the actuator 51 to move in one direction, e.g. to extend, is represented by black arrow heads while flow to cause the actuator 51 to move in the opposite direction, e.g. to retract, is represented by white arrow heads. The pressure transducer 58 is connected to hydraulic lines 71 and 72 handling hydraulic flow to and from both sides of the actuator 51, and arrows representing the connection of the transducer 58 to these lines are black and white to indicate that the transducer 58 senses pressure differentials between the lines in either direction of flow therein.

The system 1 is adapted to allow the backhoe arm 5 to be halted an any desired position. For this, controllable hydrostatic hold valves 73 and 74 are positioned respectively in the actuator supply lines 71 and 72. The hold valves 73 and 74 are controlled by the on/off valve 69 such that whenever the valve 69 is opened, the hold valves 73 and 74 also open. Conversely, when the valve 69 is closed, the hold valves 73 and 74 are also closed to trap hydraulic fluid within the actuator 51 to thereby freeze its current position. The on/off valve 69 is controlled by a hold switch 75 (FIGS. 2 and 3) which is illustrated as positioned on the handle 43 of the control arm 2.

The controller circuitry 4 incorporates a digital computer along with interfacing circuitry to the input and output circuitry within the system 1. The controller circuitry 4 includes computer storage or memory 78 which may include read only memory, read/write memory, or any appropriate combination of nonvolatile and/or volatile memory. The memory 78 stores an operating program for the system 1. A remote terminal 79, including a read out device, may be removably connected to the controller 4 for inputting certain data thereto and for selecting special routines for execution. Such special routines may include programs for scaling the motion ratio of the backhoe arm 5 to the control arm 2, for offsetting the position of the control arm 2 to the backhoe arm 5 for operator comfort, for constraining the motion of the backhoe arm 5 about certain joint axes or preventing any motion about a selected axis or axes, or for selection a teach/playback mode in which a sequence of commands representing backhoe arm articulations is stored in the memory 78 for later recall and execution. The memory 78 may also store standard sequences of commands for the backhoe arm 5, such as automatic deployment and stowing.

Referring to FIGS. 2 and 3, in the illustrated control arm 2, the feedback motors 56 for the shoulder elevation joint 40 and the wrist curl joint 45 are mounted coaxial to the respective axes of these joints and include respective heat exchangers or sinks 80 and 81 (FIG. 3). The feedback motor 56 for the shoulder swing joint 38 is mounted in the shoulder swing frame 37 and includes a heat sink 82. The feedback motor 56 for the elbow joint 42 is not mounted at the joint 42, but within the shoulder swing frame 37. Torque from the elbow joint motor is transferred to the elbow joint 42 through a parallelogram arrangement including an elbow motor arm 84 parallel to the upper arm 39. The elbow joint feedback motor and heat sink therefor are mounted below corresponding components of the shoulder elevation joint 38 and are not visible in the drawings. The control arm joint position sensors 50 are preferably mounted coaxial with the respective joint feedback motors 56.

Figure 6:
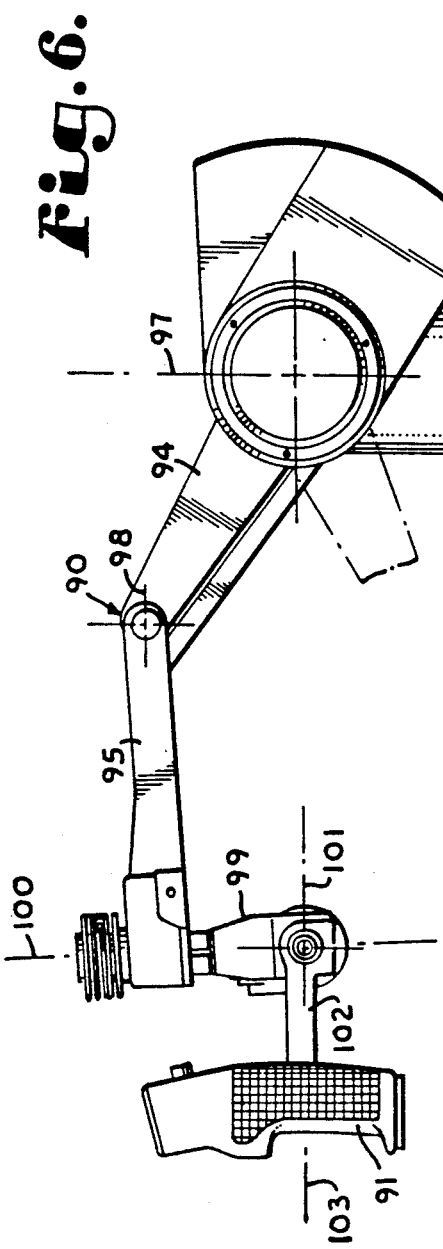
FIG. 6 is an enlarged side elevational view of a six axis control arm for use to control an implement having six degrees of freedom.
Figure 7:
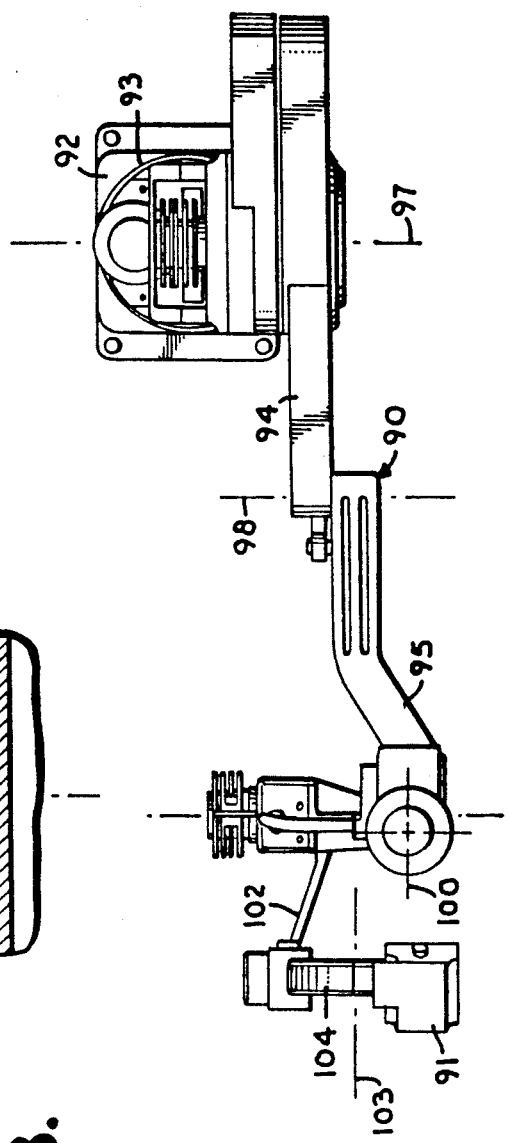
FIG. 7 is an enlarged top plan view of the six axis control arm.
Figure 8:
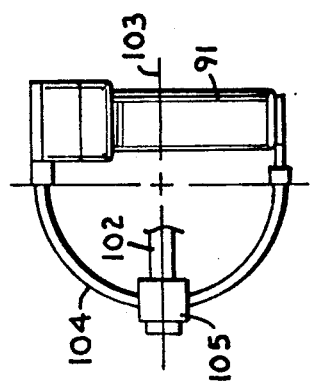
FIG. 8 is an enlarged front elevational view of the six axis control arm.

FIGS. 6-8 illustrate a modified operator control arm 90 having six degrees of freedom between a handle 91 and a base 92 of the arm 90. The arm 90 is substantially similar to the arm 2 and includes a shoulder swing frame 93 articulated to the base 92, an upper arm 94 articulated to the swing frame 93, and a forearm 95 to provide a shoulder swing joint 96, a shoulder elevation joint 97, and an elbow joint 98, all similar to corresponding components of the arm 2. In addition, the arm 90 is provided with a handle wrist or yaw frame 99 pivotally connected to the forearm 95 and providing a handle wrist or yaw joint 100 with a horizontal axis between the elbow joint 98 and a handle or wrist curl joint 101 similar to the joint 45 of the arm 2. A handle bracket 102 is connected to the yaw frame 99 through the handle curl joint 101 and has the handle 91 articulated thereto for pivoting about a wrist rotation or roll joint 103 having an axis positionable in a plane perpendicular to the axis of the handle curl joint 101. The illustrated wrist rotation joint 104 is formed by a D-shaped segment attached to the handle 91 and slidably engaging a guide 105 positioned at an end of the handle bracket 102. Each of the joints of the control arm 90 is provided with a joint position sensor and a feedback motor (not shown) in a manner similar to the control arm 2. In the case of the wrist rotation axis 103, the position sensor and feedback motor are quasi-linear in nature.

The six axis control arm 90 is particularly useful in controlling the operation of a six axis backhoe arm 110. The backhoe arm 110 is similar in many respects to the four axis backhoe area 5 but includes a bucket yaw joint 111 and a bucket wrist rotation or roll joint 112. The arm 90 includes a boom 113 and a dipper arm 114 articulated with a backhoe frame 115 and mutually in a manner similar to corresponding components of the backhoe arm 5.

A bucket curl frame 116 is connected to the dipper arm 114 through a bucket curl joint 117 for pivoting about a horizontal axis. A bucket yaw frame 118 is connected to the bucket curl frame 116 through the bucket yaw joint 111 for yawing side to side about an axis positionable in a plane perpendicular to the bucket curl axis 117. An opposed set of hydraulic bucket yaw actuators 119 are connected between the curl frame 116 and the yaw frame 118 for articulation of the yaw frame 118 relative to the curl frame 116. A backhoe bucket 120 is connected by a rotary hydraulic wrist rotation or roll actuator 121 to the yaw frame 118 for rotation of the bucket 120 about the bucket wrist rotation joint 112. The addition of the yaw joint 111 and the bucket wrist rotation joint 112 increases the utility of the backhoe arm 90 by increasing the flexibility of articulation of the bucket 120 relative to the backhoe frame 115. For example, the bucket 120 can be rotated to a side about the joint 112 and yawed to excavate beneath a horizontally extending structure, such as a pipe. Excavation in this manner with a conventional four axis backhoe, such as the backhoe 3, is not possible.

While the control system 1 has been described and illustrated in conjunction with the operation of the backhoe arms 5 of the backhoe 3, other uses of the control system 1 are contemplated and are considered equivalent uses of the present invention. For example, the front end loader arm 16 (FIG. 1) could be controlled by the system 1 using a two axis control arm not shown) similar in many respects to the control arm 2. An excavator implement (not shown) could be controlled using the system 1 with the control arm 2. In controlling such an excavator, the shoulder swing joint 38 would be analogous to a cab turret joint of an excavator.

Additionally, other types of articulation joints besides pivoting and rotary joints are intended to be covered by the present invention. For example, some backhoes are provided with telescoping dipper arms. The forearm 41 of the control arm 2 could similarly be provided with an analogous telescoping joint for controlling such a telescoping backhoe joint.

It is to be understood that while certain forms of the present invention have been illustrated and described herein it is not to be limited to the specific forms or arrangement of parts described and shown.

What is claimed and desired to be secured by Letters Patent is as follows:

1. A force reflecting control system for an earthworking implement including an implement frame with an earthworking tool articulated thereto and a tool actuator connected between said implement frame and said tool, said system comprising:
   (a) an operator input device including an operator frame with an operator control element articulated thereto;
   (b) an operator position sensor coupled between said operator frame and said element and providing an element position signal;
   (c) a feedback motor connected between said operator frame and said element and operable to apply a counter articulation force between said operator frame and said element;
   (d) a tool position sensor adapted for operative coupling between an earthworking implement frame and an earthworking tool articulated thereto, said tool position sensor providing a tool position signal;
   (e) a tool load sensor adapted for operative coupling to a tool actuator connected between said implement frame and said tool and providing a load signal having a parameter indicative of a resistance to articulation of said tool relative to said implement frame upon activation of said tool actuator;
   (f) control means having said element position sensor, said feedback motor, said tool position sensor, and said tool load sensor coupled thereto and adapted for coupling of said tool actuator thereto;
   (g) said control means activating said tool actuator to urge said tool to articulate said tool relative to said implement frame in substantial synchronism with an proportion to an articulation of said operator element relative to said operator frame; and
   (h) said control means activating said feedback motor to apply said counter articulation force between said element and said operator frame in proportion to said parameter of said load signal to thereby reflect to said operator element said resistance to articulation of said tool relative to said implement frame.

2. A system as set forth in claim 1 wherein said control means includes:
   (a) master control means coupled to said operator position sensor and said feedback motor;
   (b) slave control means coupled to said tool actuator, said tool position sensor, and said tool load sensor; and
   (c) communication link means interfacing said master control means with said slave control means, said communication link means communicating a command signal from said master control system to said slave control system to cause said articulation of said tool in response to articulation of said operator control element and said load signal from said slave control means to said master control means to activate said feedback motor.

3. A system as set forth in claim 1 wherein:
   (a) said control means is selectively operable to vary the proportion of articulation of said tool to articulation of said operator element.

4. A system as set forth in claim 1 wherein:
   (a) said control means is selectively operable to offset articulation of said tool to articulation of said operator element.

5. A system as set forth in claim 1 wherein:
   (a) said control means is selectively operable to establish boundaries to the articulation of said tool.

6. A system as set forth in claim 1 wherein:
   (a) said tool is articulated to said implement frame by tool articulation means having a selected plurality of degrees of freedom;
   (b) said operator control element is articulated to said operator frame by element articulation means having said selected plurality of degrees of freedom; and
   (c) said control means is operative to cause said tool to articulate through said degrees of freedom in substantial synchronism with the articulation of said element through said degrees of freedom.

7. A system as set forth in claim 6 wherein:
   (a) said control means is selectively operable to prevent articulation of said tool through a selected one of said degrees of freedom.

8. A system as set forth in claim 6 wherein:
   (a) said control means is selectively operable to record a sequence command signals representing a sequence of articulations of said tool, recall said sequence of command signals at a subsequent time, and cause the articulation of said tool through said sequence of articulations.

9. A system as set forth in claim 1 wherein:
(a) said earthworking implement is a backhoe including a backhoe frame; and
(b) said earthworking tool is a backhoe bucket articulated to said backhoe frame.

10. An earthworking implement comprising:
(a) an earthworking implement frame;
(b) an earthworking implement tool;
(c) an implement arm articulating said tool to said implement frame and providing at least two implement joints of articulation among implement members including said implement frame, said tool, and said implement arm to provide at least two degrees of freedom between said tool and said implement frame;
(d) a plurality of implement actuators associated respectively with said implement joints, each actuator being connected between implement members connected by a respective implement joint and operable to cause relative articulation of said implement members through said implement joint;
(e) a plurality of implement joint position sensors associated respectively said implement joints, each implement joint position sensor being coupled with the implement members connected by a respective implement joint and providing a respective implement joint position signal indicating said articulation of said implement members connected by said implement joint;
(f) a plurality of implement joint load sensors associated respectively with said implement joints, each joint load sensor being coupled with the actuator associated with a respective implement joint and providing a respective joint load signal having a parameter indicating a resistance to said articulation of said implement members connected by said implement joint;
(g) an operator frame corresponding to said implement frame;
(h) an operator control handle corresponding to said tool;
(i) an operator arm articulating said handle to said operator frame and providing at least two operator joints of articulation among operator members including said operator frame, said handle, and said operator arm; said operator arm and said operator joints corresponding respectively to said implement arm and said implement joints;
(j) a plurality of operator joint position sensors associated respectively said operator joints, each operator joint sensor being coupled with the operator members connected by a respective operator joint and providing a respective operator joint position signal indicating said articulation of said operator members connected by said operator joint;
(k) a plurality of feedback motors associated respectively with said operator, each feedback motor being connected to the operator members connected by a respective operator joint and operable to apply a counter articulation force between said operator members connected by said operator joint;
(l) control means having said actuators, said implement joint position sensors, said implement joint load sensors, said operator joint position sensors, and said feedback motors connected thereto;
(m) said control means activating one of said actuators to articulate the implement members connected by an associated implement joint through said implement joint in substantial synchronism with and proportion to an articulation of the operator members associated with a corresponding operator joint through said operator joint; and
(n) said control means activating one of said feedback motors to apply said counter articulation force to the operator members connected by an associated operator joint in proportion to said parameter of the load signal of the implement joint corresponding to said operator joint.

11. A system as set forth in claim 10 wherein said control means includes:
(a) master control means coupled to said operator joint sensors and said feedback motors;
(b) slave control means coupled to said implement implement actuators, said implement joint position sensors, and said implement joint load sensors; and
(c) communication link means interfacing said master control means with said slave control means, said communication link means communicating a command signal from said master control system to said slave control system to cause said articulation of said implement joints in response to articulation of respective ones of said operator joints and communicating said load signal from said slave control means to said master control means to activate said feedback motors.

12. An implement as set forth in claim 10 wherein:
(a) said implement arm includes first and second implement arm segments articulated by an implement joint; and
(b) said operator arm includes first and second operator arm segments articulated by an operator joint.

13. A system as set forth in claim 12 wherein:
(a) said earthworking implement is a backhoe including a backhoe frame;
(b) said implement arm is a backhoe arm;
(c) said earthworking tool is a backhoe bucket articulated to said backhoe frame by said backhoe arm;
(d) a first implement arm segment of said backhoe arm is a backhoe boom articulated to said backhoe frame by a swing joint and a boom elevation joint, said swing joint providing for pivoting said backhoe arm about a vertical swing axis, and said boom elevation joint providing for pivoting said boom about a horizontal boom elevation axis;
(e) a second implement arm segment of said backhoe arm is a backhoe dipper arm pivotally connected to said boom by a crowd joint providing for pivoting of said dipper arm about a horizontal crowd axis; and
(f) said bucket is articulated to said dipper arm by a bucket rotation axis providing for pivoting said bucket about a horizontal bucket rotation axis.

14. An implement as set forth in claim 13 wherein said backhoe arm includes:
(a) a bucket yaw joint articulating said bucket to said dipper arm and providing for pivoting said bucket about a bucket yaw axis positioned in a plane perpendicular to said bucket rotation axis.

15. An implement as set forth in claim 13 wherein said backhoe arm includes:
(a) a bucket wrist joint articulating said bucket to said dipper arm and providing for pivoting said bucket about a bucket wrist axis positioned in a plane perpendicular to said bucket rotation axis.

* * * * *